(12) United States Patent
Stenson et al.

(10) Patent No.: US 12,189,033 B2
(45) Date of Patent: Jan. 7, 2025

(54) MODELING FOLIAGE IN A SYNTHETIC ENVIRONMENT

(71) Applicant: GM Cruise Holdings LLC, San Francisco, CA (US)

(72) Inventors: Richard Stenson, San Mateo, CO (US); Jacqueline Chu, San Francisco, CA (US); Leftheris Kaleas, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 953 days.

(21) Appl. No.: 17/219,315

(22) Filed: Mar. 31, 2021

(65) Prior Publication Data

US 2022/0317301 A1    Oct. 6, 2022

(51) Int. Cl.
| | |
|---|---|
| *G01S 17/89* | (2020.01) |
| *G01S 17/931* | (2020.01) |
| *G06F 18/214* | (2023.01) |
| *G06F 18/2413* | (2023.01) |
| *G06N 20/00* | (2019.01) |
| *G06V 10/60* | (2022.01) |
| *G06V 20/64* | (2022.01) |

(52) U.S. Cl.
CPC ............ *G01S 17/89* (2013.01); *G01S 17/931* (2020.01); *G06F 18/214* (2023.01); *G06F 18/2413* (2023.01); *G06N 20/00* (2019.01); *G06V 10/60* (2022.01); *G06V 20/64* (2022.01)

(58) Field of Classification Search
None
See application file for complete search history.

(56) References Cited

FOREIGN PATENT DOCUMENTS

CN       108196266 A   *   6/2018   ............. G01N 21/17

OTHER PUBLICATIONS

Eugene, "Realistic Placement of Plants for Virtual Environments", IEEE Computer Graphics and Applications ( vol. 31, Issue: 4, pp. 66-77, Jul.-Aug. 2011) (Year: 2011).*

* cited by examiner

*Primary Examiner* — Hovhannes Baghdasaryan

(57) ABSTRACT

The subject disclosure relates to techniques for integrating synthetic plants into a virtual scene. A process of the disclosed technology can include receiving a digital asset comprising synthetic foliage, processing the digital asset to modify at least one parameter associated with the synthetic foliage to generate a modified digital asset, acquiring synthetic sensor data corresponding with the modified digital asset, and calculating a classification score for the modified digital asset based on the synthetic sensor data.

17 Claims, 8 Drawing Sheets

MODELING FOLIAGE IN A SYNTHETIC ENVIRONMENT

BACKGROUND

1. Technical Field

The subject technology provides solutions for simulating synthetic foliage and in particular for simulating synthetic foliage recognizable by light detection and ranging sensors.

2. Introduction

Autonomous vehicles operate without human drivers. As autonomous vehicles navigate various environments, the autonomous vehicles rely on sensors to detect its surroundings. Training processing devices to understand sensor data, however, requires large amounts of sensor data. Additionally, obtaining this sensor data can be costly and inefficient.

DETAILED DESCRIPTION

Figure 1:
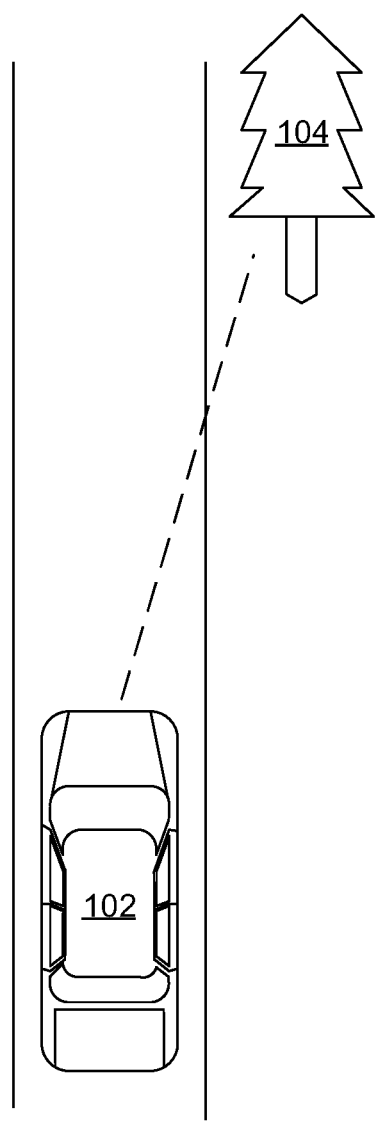
FIG. 1 illustrates a simulated environment having synthetic foliage.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles utilize sensors, such as cameras and Light Detection and Ranging (LiDAR) sensors, to detect objects and classify them accordingly. These sensors collect sensor data that need to be interpreted by a computing system. These computing systems require large amounts of sensor data to be effective. However, collecting large amounts of sensor data requires autonomous vehicles to be constantly navigating through various environments which can be costly, time consuming, and inefficient. Thus, there is a need in the art for an efficient method for collecting large amounts of sensor data. Even with large amounts of sensor data, there may be difficulties in correctly classifying some objects, such as foliage and atmospheric phenomena. For example, when utilizing real world sensor data directly to simulate a simulated environment, some objects may be incorrectly detected and/or classified. It is important that objects are correctly detected and classified to ensure proper operations of autonomous vehicles. For example, an autonomous vehicle should detect and classify steam as steam and react accordingly (e.g., continue driving because the steam is not a dangerous object). As another example, an autonomous vehicle should detect and classify a fallen tree as a tree and react accordingly (e.g., stop the vehicle because the fallen tree is a hazard).

The present technology provides solutions for generating large amounts of sensor data by simulating simulated environments, in which simulated autonomous vehicles with simulated sensors can collect simulated sensor data. The simulated sensor data can then be used to train a machine learning model to improve detection and classification of various objects, such as foliage and atmospheric phenomena. Simulating environments, however, also has its own set of challenges. Generating a simulated environment can be challenging due to digital assets being different from real world versions of the asset. For example, in real life, a tree is a tree and looks like a tree. Light Detection and Ranging (LiDAR) sensor data may not adequately capture the nuances of the entire tree and may show a general outline or silhouette of the tree instead. This error margin is further exacerbated when using a digital asset because the digital asset may not be a perfect representation of a real-world version of the asset. Additionally, these digital assets can be unmanageably large. For example, a single tree can have millions of polygons due to contours, edges, branches, leaves, etc. Thus, there is also a need in the art to simulate digital assets accurately and efficiently.

Accordingly, the present technology also provides solutions for generating digital assets for simulations that are configured to be more accurately and efficiently detected and classified.

FIG. 1 illustrates a virtual scene or simulated environment 100 having an autonomous vehicle 102 and synthetic foliage 104. Simulated environment 100 can be simulated by a processing device (e.g., a server or remote computing system 750 illustrated in FIG. 7).

Simulated environment 100 can be a simulation of a real-world geographic region. For example, simulated environment 100 can be a simulation of the San Francisco region. Furthermore, simulated environment 100 can have digital assets, such as synthetic foliage 104. Synthetic foliage 104 can include trees, bushes, flora, etc. Additionally, synthetic foliage 104 can be simulated to be more readily detectable and accurately classified as foliage by aspects of the present technology.

As autonomous vehicle 102 navigates through simulated environment 100, sensors of autonomous vehicle 102 may detect and classify synthetic foliage 104 as foliage and respond accordingly. For example, cameras and/or Light Detection and Ranging (LiDAR) sensors of autonomous vehicle 102 may detect a leaf falling from a tree. An internal computing system of autonomous vehicle 102 (e.g., internal computing system 710 illustrated in FIG. 7) can then classify the leaf as foliage based on the sensor data. The internal computing system of autonomous vehicle 102 can then determine a course of action (e.g., continue driving because the leaf is not a danger and it would be an uncomfortable ride experience to have an autonomous vehicle suddenly and unnecessarily stop).

Figure 2:
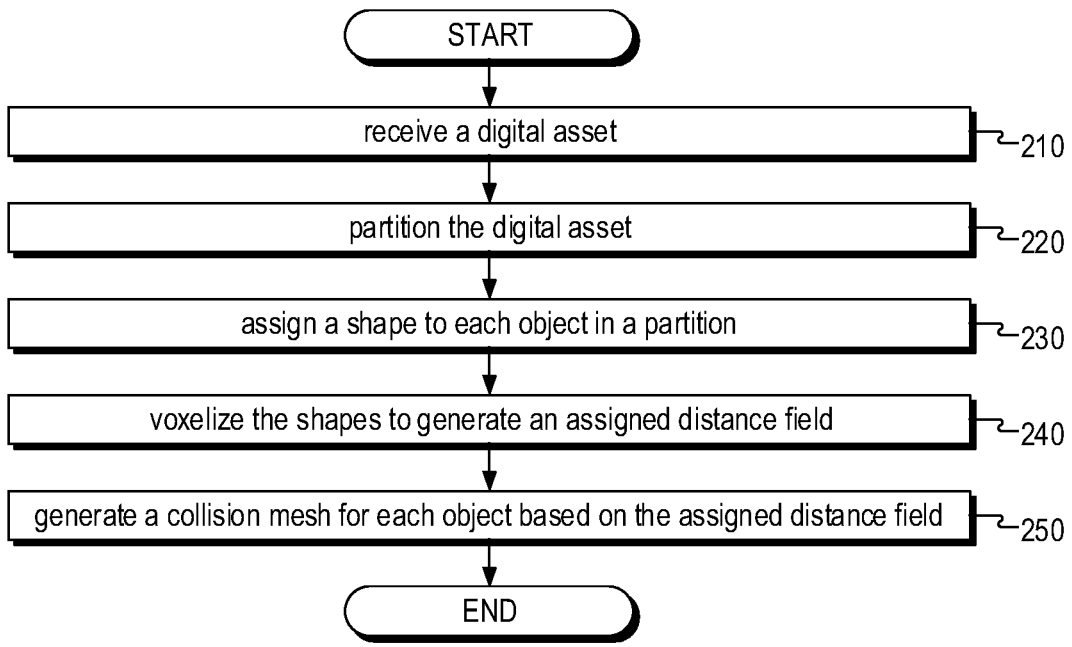
FIG. 2 illustrates a flowchart of a method for processing a digital asset.

FIG. 2 illustrates an example method 200 for processing a digital asset to generate a modified digital asset, such as synthetic foliage 104 as described with respect to FIG. 1. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

Method 200 begins at step 210, in which a computing device (e.g., remote computing system 750 illustrated in FIG. 7) receives a digital asset. For example, the computing device can receive a foliage asset (e.g., a tree, or a bush). In some implementations, the foliage asset may already be a correctly classified asset. In other words, the foliage asset may have already been detected and classified by a computing device (e.g., internal computing system 710 of autonomous vehicle 710 illustrated in FIG. 7).

At step 220, the computing device can partition the foliage asset into at least a first partition and a second partition. The first partition may be for portions of the foliage asset that are more recognizable (e.g., the branches or trunk of a tree). The second partition may be for portions of the foliage asset that are more complex (e.g., leaves of the tree). In some embodiments, the partitions may include slices of each asset. For example, the leaves in the second partition may be stored as volumetric slices. It is to be understood that the usage of first partition and second partition are for clarity and discussion purposes only and that one skilled in the art would understand that the order and/or number of partitions can be easily manipulated.

At step 230, the computing device can then assign a first shape to each object in the second partition. For example, a sphere can be assigned to each leaf (and/or slice thereof) in the second partition. In some embodiments, the computing device can scatter points onto a mesh of the foliage asset. The scattered points can then be filtered using a noise filter and/or another density-based filter to remove points with low point density in a given area. For example, a high point density can correlate to a high probability that there is foliage and/or more foliage (e.g., multiple leaves or bushes) in that area. Thus, the computing device can assign a position of the first shape to these higher density areas. In some embodiments, the computing device can also convert the shapes into polygons and perturb the vertices with a noise function to look more natural.

At step 240, the computing device can then voxelize the shapes to generate an assigned distance field for each object in the second partition.

At step 250, the computing device can then utilize the distance field to generate a collision mesh for each object in the second partition. Thus, each object can then be detected properly by LiDAR sensors.

Figure 3:
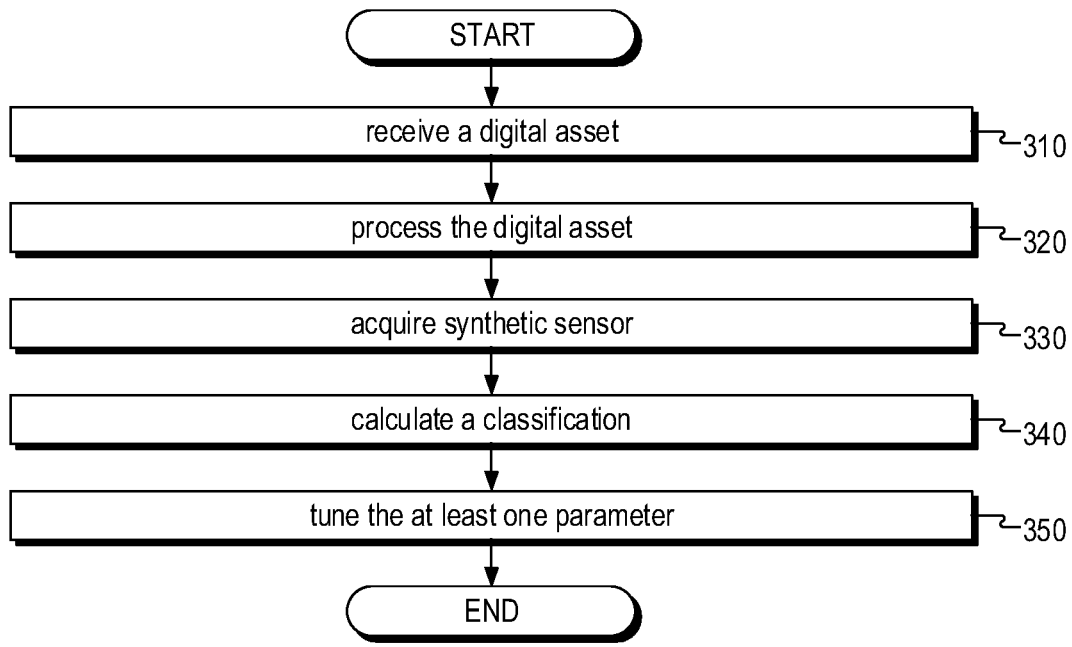
FIG. 3 is a flowchart of a method for generating a digital asset for simulating foliage according to an example of the instant disclosure.

FIG. 3 illustrates an example method 300 for simulating a digital asset, such as synthetic foliage 104 as described with respect to FIG. 1. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

Method 300 begins with receiving a digital asset comprising synthetic foliage at step 310. For example, remote computing system 750 illustrated in FIG. 7 may receive a digital asset comprising synthetic foliage.

According to some examples, method 300 includes processing the digital asset to modify at least one parameter associated with the synthetic foliage to generate a modified digital asset. For example, remote computing system 750 illustrated in FIG. 7 may process the digital asset to modify at least one parameter associated with the synthetic foliage to generate a modified digital asset. The parameters can include, but are not limited to, size, shape, reflectivity, density, etc. In some embodiments, remote computing system 750 may utilize method 200 to process the digital asset. For example, remote computing system 750 can voxelize one or more leaves selected from among the synthetic foliage.

At step 330, method 300 includes acquiring synthetic sensor data corresponding with the modified digital asset. For example, remote computing system 750 illustrated in FIG. 7 may acquire synthetic sensor data corresponding with the modified digital asset. The synthetic sensor data comprises synthetic Light Detection and Ranging data.

At step 340, method 300 includes calculating a classification score for the modified digital asset based on the synthetic sensor data. For example, remote computing system 750 illustrated in FIG. 7 may calculate a classification score for the modified digital asset based on the synthetic sensor data.

In some embodiments, calculating a classification score can include providing the synthetic sensor data to a machine-learning model and receiving a semantic label from the machine-learning model that identifies an object type associated with the modified digital asset. The classification score can indicate how accurate the classification of an object is. For example, an accurate classification can include classifying a tree as a tree, while an inaccurate classification can include classifying the tree as something other than a tree. Then, based on how accurate the classification is, the classification score may be of a higher absolute value. In some embodiments, the classification score can also include how frequently the classification of an object is accurate. In some embodiments, remote computing system 750 can also train a machine-learning model by providing the synthetic sensor data and a semantic label identifying an object type with the modified digital asset.

At step 350, method 300 includes tuning the at least one parameter associated with the synthetic foliage based on the classification score. For example, remote computing system 750 illustrated in FIG. 7 may tune the at least one parameter associated with the synthetic foliage based on the classification score. For example, if the classification score is below a desired value, remote computing system 750 can generate another modified (updated) digital asset. More specifically, remote computing system 750 can tune and/or update the at least one parameter to generate another modified (updated) digital asset. Remote computing system 750 can then calculate a classification score for the newly generated modified digital asset. In other words, remote computing system 750 can repeatedly tune at least one parameter until a modified digital asset achieves a sufficient classification score, indicating that the modified digital asset adequately represents foliage in the simulated environment. Thus, each iteration of parameter modification can be guided by the strength of the classification accuracy (e.g., classification score) to generate assets with higher classification accuracies.

The modified digital asset having a sufficient classification score can then be generated in the simulated environment to harvest synthetic sensor data simulated autonomous vehicles as discussed above with respect to FIG. 1.

Figure 4:
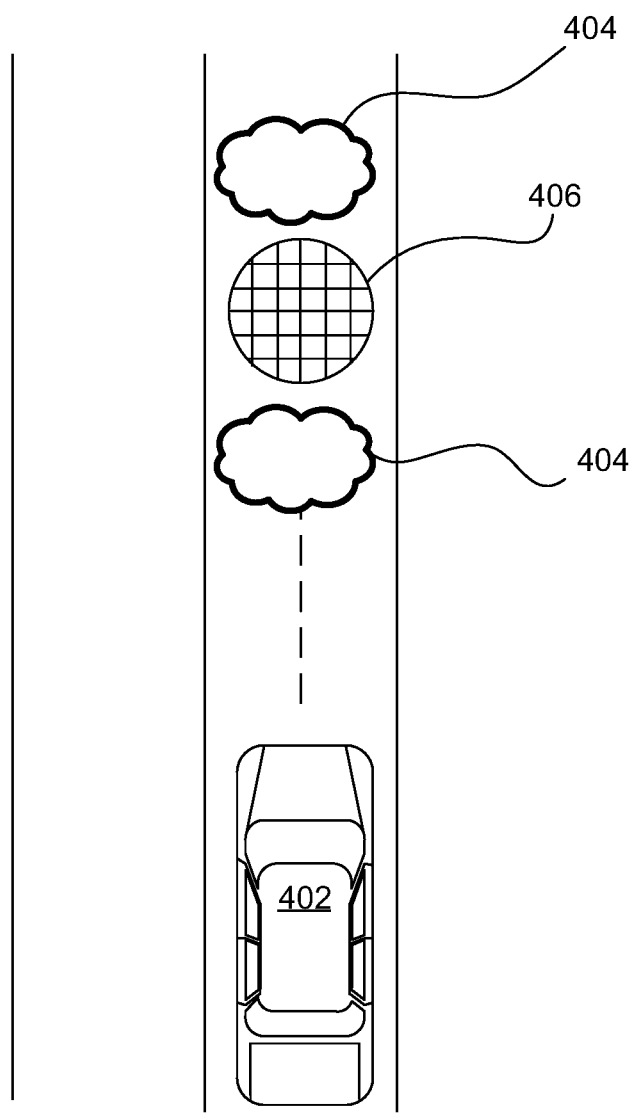
FIG. 4 illustrates a simulated environment having atmospheric events.

FIG. 4 illustrates a simulated environment 400 having an autonomous vehicle 402 detecting transient objects and/or localized atmospheric events 404, such as steam 404 dispersing from a source 406 (e.g., a manhole cover). For example, A computing device (e.g., remote computing system 750 illustrated in FIG. 7) may simulate an autonomous vehicle 402 navigating along streets, during which autonomous vehicle 402 may encounter steam 404 emanating from a manhole cover. In traditional technologies, autonomous vehicle 402 may face challenges in determining and detecting the steam. These challenges then make classification of the steam difficult, which can result in unintended operations by the autonomous vehicle 402. Using the present technology, simulated environment 400 can provide a synthetic localized atmospheric event 404, such as steam that is more recognizable and detectable by sensor systems of autonomous vehicle 402 (e.g., sensor systems 702-704). Synthetic localized atmospheric events 404 can include various parameters including, but not limited to, reflectivity, texture, brightness, density, size, shape, etc.

Figure 5:
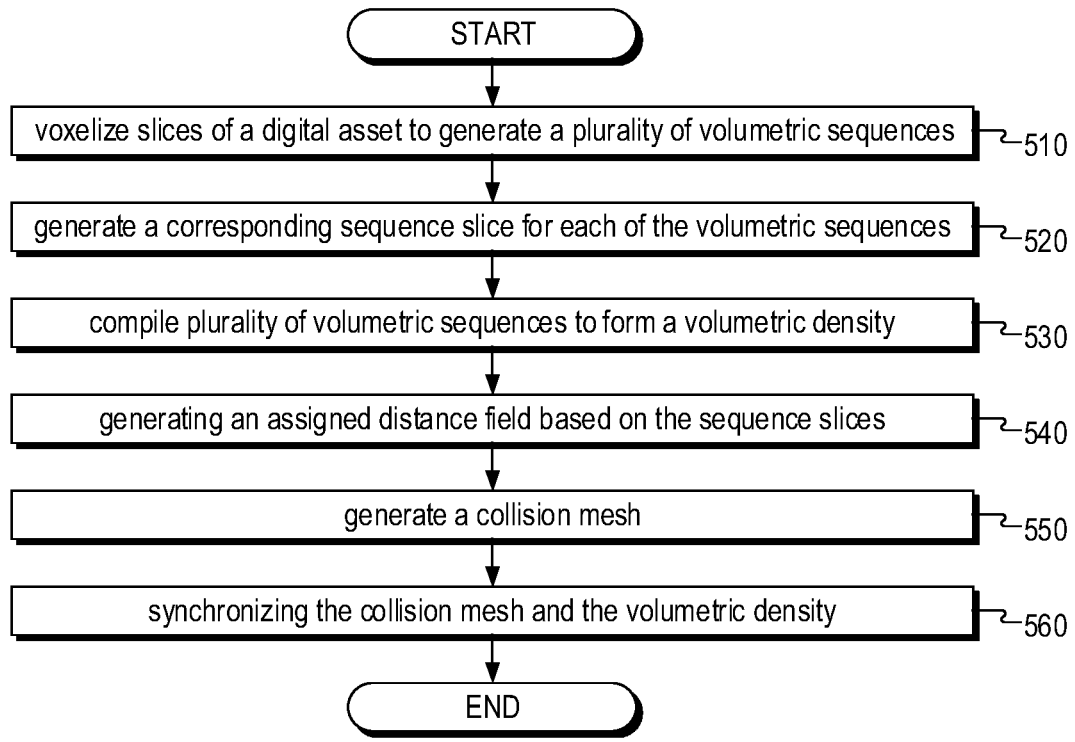
FIG. 5 illustrates a flowchart of a method for processing a digital asset.

FIG. 5 illustrates a flowchart of a method for processing a digital asset. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

Method 500 starts with a digital asset comprising a localized atmospheric event (e.g., steam). At step 510, method 500 includes voxelizing slices of the localized atmospheric event to generate a plurality of volumetric sequences. For example, remote computing system 750 illustrated in FIG. 7 may voxelize slices of the localized atmospheric event to generate a plurality of volumetric sequences.

At step 520, method 500 includes generating a corresponding plurality of sequence slices for each of the volumetric sequences. For example, remote computing system 750 illustrated in FIG. 7 may generate a corresponding plurality of sequence slices for each of the volumetric sequences.

At step 530, method 500 includes compiling the plurality of volumetric sequences to generate a volumetric density. For example, remote computing system 750 illustrated in FIG. 7 may compile the plurality of volumetric sequences to generate a volumetric density.

At step 540, method 500 includes generating an assigned distance field based on the corresponding plurality of sequence slices. For example, remote computing system 750 illustrated in FIG. 7 may generate an assigned distance field based on the corresponding plurality of sequence slices.

At step 550, method 500 includes generating a collision mesh based on the assigned distance field. For example, remote computing system 750 illustrated in FIG. 7 may generate a collision mesh based on the assigned distance field.

At step 560, method 500 includes synchronizing the collision mesh and the volumetric density. For example, remote computing system 750 illustrated in FIG. 7 may synchronize the collision mesh and the volumetric density. The synchronized collision mesh and volumetric density may then be used to model atmospheric phenomena as a synthetic localized atmospheric event.

Figure 6:
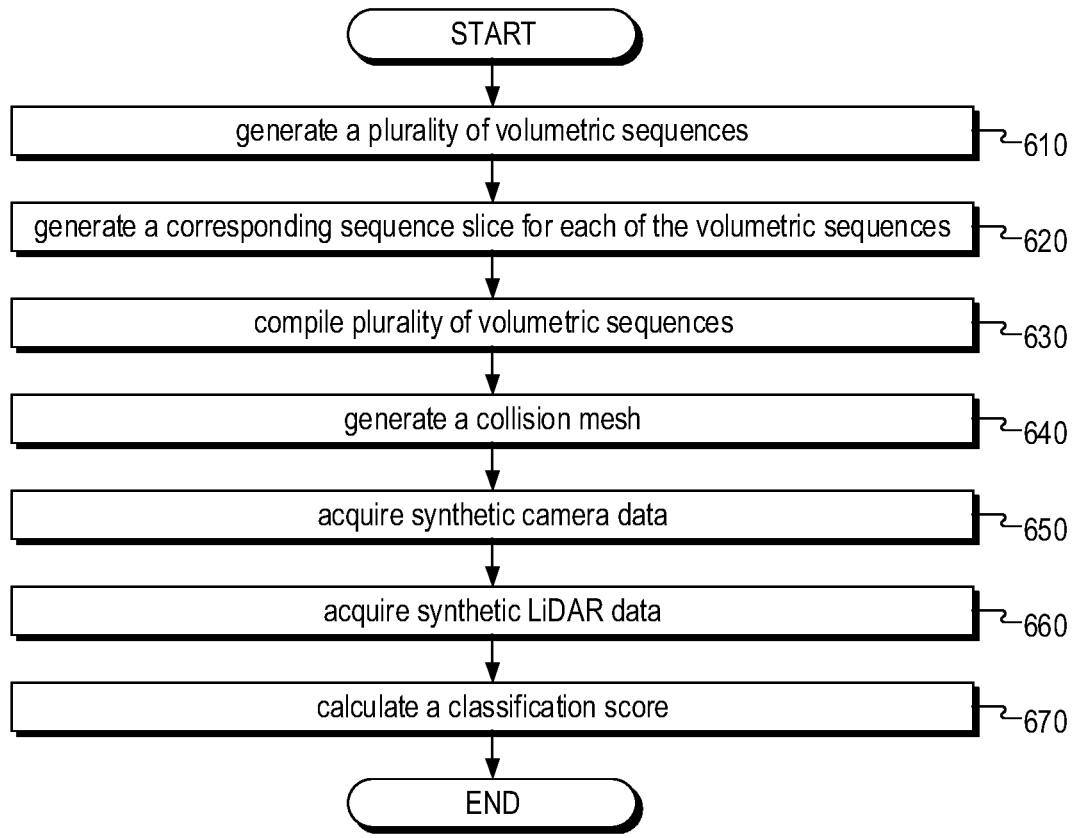
FIG. 6 is a flowchart of a method for simulating a digital asset according to an example of the instant disclosure.

FIG. 6 illustrates an example method 600 for simulating a digital asset. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

Method 600 starts with generating a plurality of volumetric sequences at step 610. For example, the remote computing system 750 illustrated in FIG. 7 may generate a plurality of volumetric sequences. In some embodiments, remote computing system 750 can voxelize slices of a digital asset comprising a localized atmospheric event (e.g., steam) to generate the plurality of volumetric slices. In some embodiments, generating the corresponding plurality of sequence slices may include assigning a texture parameter to each of the corresponding plurality of sequence slices.

At step 620, method 600 includes generating a corresponding plurality of sequence slices for each of the plurality of volumetric sequences. For example, remote computing system 750 illustrated in FIG. 7 may generate a corresponding plurality of sequence slices for each of the plurality of volumetric sequences.

At step 630, method 600 includes compiling the plurality of volumetric sequences to generate a synthetic localized atmospheric event. For example, remote computing system 750 illustrated in FIG. 7 may compile the plurality of volumetric sequences to generate a synthetic localized atmospheric event. In some embodiments, compiling the plurality of volumetric sequences includes interpolating the plurality of sequence slices.

At step 640, method 600 includes generating a collision mesh based on the plurality of sequence slices. For example, remote computing system 750 illustrated in FIG. 7 may generate a collision mesh based on the plurality of sequence slices.

At step 650, method 600 includes acquiring synthetic camera data corresponding with the synthetic localized atmospheric event. For example, remote computing system 750 illustrated in FIG. 7 may acquire synthetic camera data corresponding with the synthetic localized atmospheric event.

At step 660, method 600 includes acquiring synthetic LiDAR data corresponding with the synthetic localized atmospheric event. For example, remote computing system 750 illustrated in FIG. 7 may acquire synthetic LiDAR data corresponding with the synthetic localized atmospheric event. In some embodiments, the synthetic LiDAR data and the synthetic camera data are synchronized in time.

At step 670, method 600 includes calculating a classification score for the digital asset based on the synthetic sensor data. For example, remote computing system 750 illustrated in FIG. 7 may and calculate a classification score for the digital asset based on the synthetic camera and/or LiDAR data.

It is further considered that remote computing system 750 can tune at least one parameter associated with the synthetic localized atmospheric event based on the classification score. More specifically, the classification score may be below a desired value. Thus, remote computing system 750 can tune the at least one parameter to generate a modified synthetic localized atmospheric effect. Remote computing system 750 can then calculate a classification score for the newly generated modified synthetic localized atmospheric effect. In other words, remote computing system 750 can repeatedly tune at least one parameter until a modified synthetic localized atmospheric effect achieves a sufficient classification score.

Additionally, it is contemplated that the synthetic camera data and synthetic lidar data can be utilized to train a machine-learning model. It is further contemplated that the machine-learning model can be used to receive a semantic label that identifies the object type of the synthetic localized atmospheric event. Furthermore, the machine-learning model can be trained to provide a classifications score based on the semantic label and synthetic camera data and/or synthetic LiDAR data.

Figure 7:
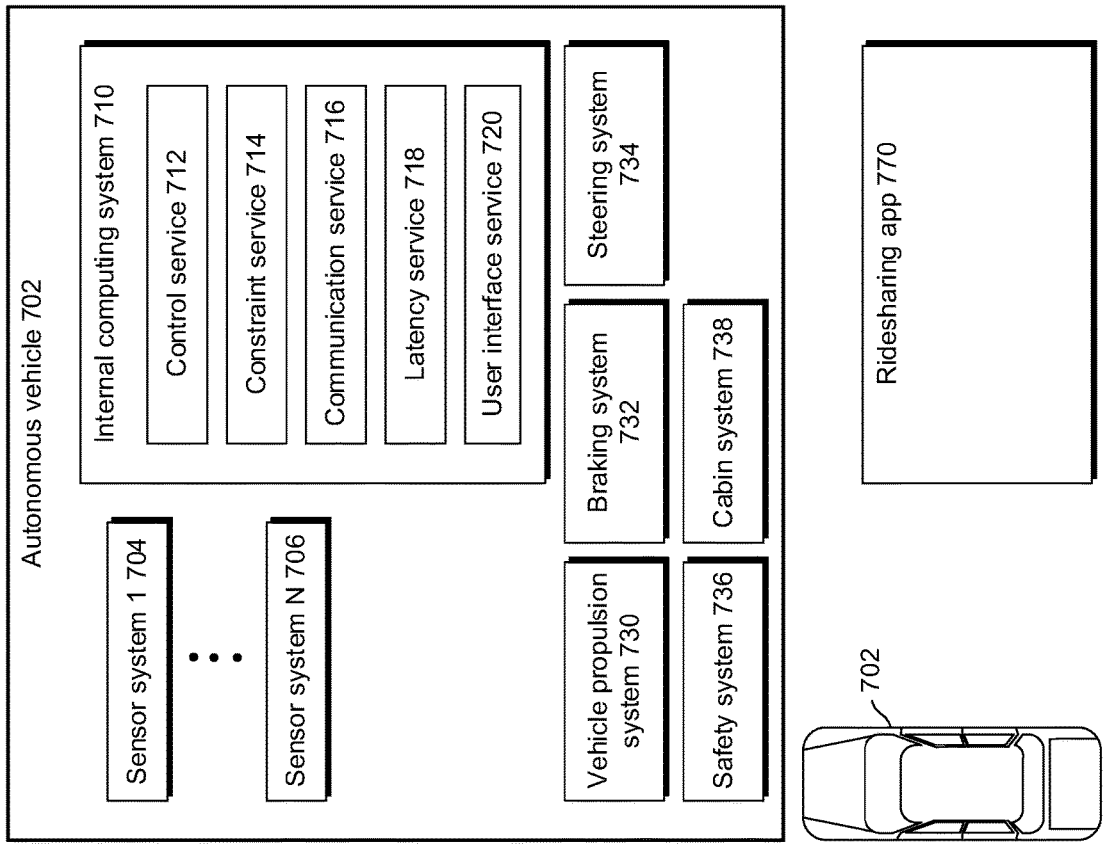
FIG. 7 illustrates environment that includes an autonomous vehicle in communication with a computing system.
Figure 7:
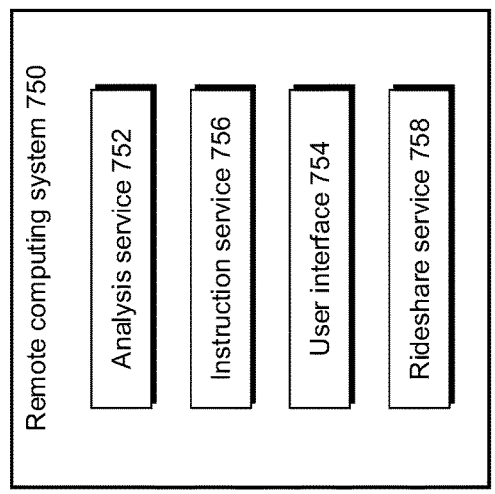

FIG. 7 illustrates environment 700 that includes an autonomous vehicle 702 in communication with a computing system 750.

The autonomous vehicle 702 can navigate about roadways without a human driver based upon sensor signals output by sensor systems 704-706 of the autonomous vehicle 702. The autonomous vehicle 702 includes a plurality of sensor systems 704-706 (a first sensor system 702 through an Nth sensor system 704). The sensor systems 704-706 are of different types and are arranged about the autonomous vehicle 702. For example, the first sensor system 704 may be a camera sensor system and the Nth sensor system 706 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 702 further includes several mechanical systems that are used to effectuate appropriate motion of the autonomous vehicle 702. For instance, the mechanical systems can include but are not limited to, a vehicle propulsion system 730, a braking system 732, and a steering system 734. The vehicle propulsion system 730 may include an electric motor, an internal combustion engine, or both. The braking system 732 can include an engine brake, brake pads, actuators, and/or any other suitable componentry that is configured to assist in decelerating the autonomous vehicle 702. The steering system 734 includes suitable componentry that is configured to control the direction of movement of the autonomous vehicle 702 during navigation.

The autonomous vehicle 702 further includes a safety system 736 that can include various lights and signal indicators, parking brake, airbags, etc. The autonomous vehicle 702 further includes a cabin system 738 that can include cabin temperature control systems, in-cabin entertainment systems, etc.

The autonomous vehicle 702 additionally comprises an internal computing system 710 that is in communication with the sensor systems 704-706 and the mechanical systems 730, 732, 734. The internal computing system includes at least one processor and at least one memory having computer-executable instructions that are executed by the processor. The computer-executable instructions can make up one or more services responsible for controlling the autonomous vehicle 702, communicating with remote computing system 750, receiving inputs from passengers or human co-pilots, logging metrics regarding data collected by sensor systems 704-706 and human co-pilots, etc.

The internal computing system 710 can include a control service 712 that is configured to control operation of the vehicle propulsion system 706, the braking system 708, the steering system 710, the safety system 736, and the cabin system 738. The control service 712 receives sensor signals from the sensor systems 702-704 as well communicates with other services of the internal computing system 710 to effectuate operation of the autonomous vehicle 702. In some embodiments, control service 712 may carry out operations in concert one or more other systems of autonomous vehicle 702.

The internal computing system 710 can also include a constraint service 714 to facilitate safe propulsion of the autonomous vehicle 702. The constraint service 716 includes instructions for activating a constraint based on a rule-based restriction upon operation of the autonomous vehicle 702. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 712.

The internal computing system 710 can also include a communication service 716. The communication service can include both software and hardware elements for transmitting and receiving signals from/to the remote computing system 750. The communication service 716 is configured to transmit information wirelessly over a network, for example, through an antenna array that provides personal cellular (long-term evolution (LTE), 3G, 5G, etc.) communication.

In some embodiments, one or more services of the internal computing system 710 are configured to send and receive communications to remote computing system 750 for such reasons as reporting data for training and evaluating machine learning algorithms, requesting assistance from remoting computing system or a human operator via remote computing system, software service updates, ridesharing pickup and drop off instructions etc.

The internal computing system 710 can also include a latency service 718. The latency service 718 can utilize timestamps on communications to and from the remote computing system 750 to determine if a communication has been received from the remote computing system 750 in time to be useful. For example, when a service of the internal computing system 710 requests feedback from remote computing system 750 on a time-sensitive process, the latency service 718 can determine if a response was timely received from remote computing system 750 as information can quickly become too stale to be actionable. When the latency service 718 determines that a response has not been received within a threshold, the latency service 718 can enable other systems of autonomous vehicle 702 or a passenger to make necessary decisions or to provide the needed feedback.

The internal computing system 710 can also include a user interface service 720 that can communicate with cabin system 738 in order to provide information or receive information to a human co-pilot or human passenger. In some embodiments, a human co-pilot or human passenger may be required to evaluate and override a constraint from constraint service 714, or the human co-pilot or human passenger may wish to provide an instruction to the autonomous vehicle 702 regarding destinations, requested routes, or other requested operations.

As described above, the remote computing system 750 is configured to send/receive a signal from the autonomous vehicle 740 regarding reporting data for training and evaluating machine learning algorithms, requesting assistance from remoting computing system or a human operator via the remote computing system 750, software service updates, ridesharing pickup and drop off instructions, etc.

The remote computing system 750 includes an analysis service 752 that is configured to receive data from autonomous vehicle 702 and analyze the data to train or evaluate machine learning algorithms for operating the autonomous vehicle 702. The analysis service 752 can also perform analysis pertaining to data associated with one or more errors or constraints reported by autonomous vehicle 702. In some embodiments, analysis service 752 is also configured to simulate a simulated environment having a simulated autonomous vehicle with simulated sensors. The simulated sensors are configured to receive synthetic sensor data. Analysis service 752 can also be configured to determine synthetic sensor data from autonomous vehicle 702. Additionally, analysis service 752 can utilize the synthetic sensor data to classify objects in the synthetic sensor data and determine a classification for the objects. Analysis service 752 can then compare the classification to determine a classification score. The classification score can then be used by analysis service 752 to tune parameters of a digital asset associated with the objects.

The remote computing system 750 can also include a user interface service 754 configured to present metrics, video, pictures, sounds reported from the autonomous vehicle 702 to an operator of remote computing system 750. User interface service 754 can further receive input instructions from an operator that can be sent to the autonomous vehicle 702.

The remote computing system 750 can also include an instruction service 756 for sending instructions regarding the operation of the autonomous vehicle 702. For example, in response to an output of the analysis service 752 or user interface service 754, instructions service 756 can prepare instructions to one or more services of the autonomous vehicle 702 or a co-pilot or passenger of the autonomous vehicle 702.

The remote computing system 750 can also include a rideshare service 758 configured to interact with ridesharing applications 770 operating on (potential) passenger computing devices. The rideshare service 758 can receive requests to be picked up or dropped off from passenger ridesharing app 770 and can dispatch autonomous vehicle 702 for the trip. The rideshare service 758 can also act as an intermediary between the ridesharing app 770 and the autonomous vehicle wherein a passenger might provide instructions to the autonomous vehicle to 702 go around an obstacle, change routes, honk the horn, etc.

Figure 8:
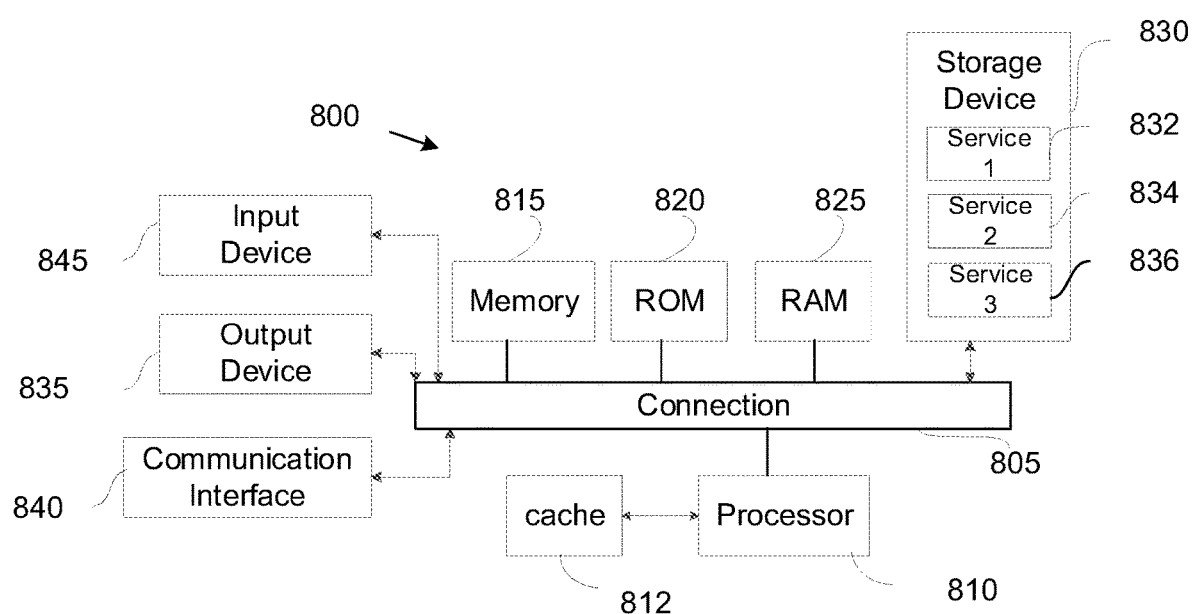
FIG. 8 shows an example of a system for implementing certain aspects of the present technology.

FIG. 8 shows an example of computing system 800, which can be for example any computing device making up internal computing system 710, remote computing system 750, and/or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for integrating synthetic plants into a virtual scene, the method comprising:
    receiving a digital asset comprising synthetic foliage;
    processing the digital asset to modify at least one parameter associated with the synthetic foliage to generate a modified digital asset;
    acquiring synthetic sensor data corresponding with the modified digital asset by virtually scanning the virtual scene, including the modified digital asset, using a virtual Light Detection and Ranging (LiDAR) sensor to produce the synthetic sensor data, wherein the modified digital asset and the synthetic sensor data are separate data structures;
    calculating a classification score for the modified digital asset based on the synthetic sensor data; and
    navigating, by an autonomous vehicle, based on the synthetic sensor data, the classification score, and a semantic label identifying an object type with the modified digital asset.

2. The method of claim 1, wherein processing the digital asset to modify at least one parameter further comprises:
    voxelizing one or more leaves selected from among the synthetic foliage.

3. The method of claim 1, further comprising:
    repeatedly performing the processing, acquiring, and calculating operations to tuneing the at least one parameter associated with the synthetic foliage based on the classification score until the classification score meets a threshold value.

4. The method of claim 1, wherein the at least one parameter includes a reflectivity parameter for one or more leaves in the synthetic foliage.

5. The method of claim 1, wherein calculating the classification score further comprises:
    providing the synthetic sensor data to a machine-learning model; and
    receiving a semantic label from the machine-learning model that identifies an object type associated with the modified digital asset.

6. The method of claim 1, wherein calculating the classification score further comprises:
    training a machine-learning model by providing the synthetic sensor data and a semantic label identifying an object type with the modified digital asset.

7. A system comprising:
    a storage configured to store instructions;
    a processor configured to execute the instructions and cause the processor to:
        receive a digital asset comprising synthetic foliage;
        process the digital asset to modify at least one parameter associated with the synthetic foliage to generate a modified digital asset by virtually scanning the virtual scene, including the modified digital asset, using a virtual Light Detection and Ranging (LiDAR) sensor to produce the synthetic sensor data, wherein the modified digital asset and the synthetic sensor data are separate data structures;
        acquire synthetic sensor data corresponding with the modified digital asset; and
        calculate a classification score for the modified digital asset based on the synthetic sensor data; and
        navigate, by an autonomous vehicle, based on the synthetic sensor data, the classification score, and a semantic label identifying an object type with the modified digital asset.

8. The system of claim 7, wherein the processor is configured to execute the instructions and cause the processor to:
    voxelize one or more leaves selected from among the synthetic foliage.

9. The system of claim 7, wherein the processor is configured to execute the instructions and cause the processor to:
    repeatedly performing the processing, acquiring, and calculating operations to tune the at least one parameter associated with the synthetic foliage based on the classification score until the classification score meets a threshold value.

10. The system of claim 7, wherein the at least one parameter includes a reflectivity parameter for one or more leaves in the synthetic foliage.

11. The system of claim 7, wherein the processor is configured to execute the instructions and cause the processor to:
provide the synthetic sensor data to a machine-learning model; and
receive a semantic label from the machine-learning model that identifies an object type associated with the modified digital asset.

12. The system of claim 7, wherein the processor is configured to execute the instructions and cause the processor to:
train a machine-learning model by provide the synthetic sensor data and a semantic label identifying an object type with the modified digital asset.

13. A non-transitory computer readable medium comprising instructions, the instructions, when executed by a computing system, cause the computing system to:
receive a digital asset comprising synthetic foliage;
process the digital asset to modify at least one parameter associated with the synthetic foliage to generate a modified digital asset;
acquire synthetic sensor data corresponding with the modified digital asset by virtually scanning the virtual scene, including the modified digital asset, using a virtual Light Detection and Ranging (LiDAR) sensor to produce the synthetic sensor data, wherein the modified digital asset and the synthetic sensor data are separate data structures;
calculate a classification score for the modified digital asset based on the synthetic sensor data; and
navigate, by an autonomous vehicle, based on the synthetic sensor data, the classification score, and a semantic label identifying an object type with the modified digital asset.

14. The computer readable medium of claim 13, wherein the computer readable medium further comprises instructions that, when executed by the computing system, cause the computing system to:
voxelize one or more leaves selected from among the synthetic foliage.

15. The computer readable medium of claim 13, wherein the computer readable medium further comprises instructions that, when executed by the computing system, cause the computing system to:
repeatedly performing the processing, acquiring, and calculating operations to tune the at least one parameter associated with the synthetic foliage based on the classification score until the classification score meets a threshold value.

16. The computer readable medium of claim 13, the at least one parameter includes a reflectivity parameter for one or more leaves in the synthetic foliage.

17. The computer readable medium of claim 13, wherein the computer readable medium further comprises instructions that, when executed by the computing system, cause the computing system to:
provide the synthetic sensor data to a machine-learning model; and
receive a semantic label from the machine-learning model that identifies an object type associated with the modified digital asset.

* * * * *